United States Patent [19]

Shibata et al.

[11] 4,379,009
[45] Apr. 5, 1983

[54] SEALING METHOD USING HEAT-SHRINKABLE FILM

[75] Inventors: Takaaki Shibata, Nagareyama; Tetsuhiro Yamamoto, Osaka, both of Japan

[73] Assignee: Doryokuro Kakunenryo Kaihatsu Jigyodan, Tokyo, Japan

[21] Appl. No.: 284,254

[22] Filed: Jul. 17, 1981

[30] Foreign Application Priority Data

Sep. 12, 1980 [JP] Japan .................... 55-126836

[51] Int. Cl.³ .................... B29C 27/00; B32B 31/00; B29C 17/04; B23P 11/02
[52] U.S. Cl. .................... 156/86; 156/215; 428/916; 285/381; 29/447; 376/204
[58] Field of Search .................... 156/76, 86, 165, 215, 156/213, 85, 218, 300, 307, 187; 428/916, 915, 41, 43, 78, 79, 346; 285/381, 93, 254; 376/203, 204; 29/447, 511, 458

[56] References Cited

U.S. PATENT DOCUMENTS

| 2,845,728 | 8/1958 | Huber | 428/916 |
| 3,287,037 | 11/1966 | Bragg | 29/447 |
| 3,650,869 | 3/1972 | Lindell | 156/213 |
| 3,770,556 | 11/1973 | Evans et al. | 156/216 |
| 4,070,044 | 1/1978 | Carrow | 156/86 |

FOREIGN PATENT DOCUMENTS

| 1066824 | 10/1959 | Fed. Rep. of Germany | 285/381 |
| 51-47067 | 10/1974 | Japan | 285/381 |

Primary Examiner—Edward C. Kimlin
Assistant Examiner—Louis Falasco
Attorney, Agent, or Firm—Fleit, Jacobson & Cohn

[57] ABSTRACT

A method for sealing an object having a peripheral surface, surfaces substantially perpendicular to the peripheral surface and infinite enlongated bodies projecting from the surfaces perpendicular to the peripheral surface, which method comprises: wrapping the peripheral surface with a heat-shrinkable film in such a manner that both side edges of the film extend beyond the side edges of the peripheral surface; bonding longitudinal edges of the film to each other; and heating the heat-shrinkable film to permit the film to shrink to thereby seal the peripheral surface and a peripheral portion of the surfaces perpendicular to said peripheral surface, except said infinite elongated bodies.

9 Claims, 5 Drawing Figures

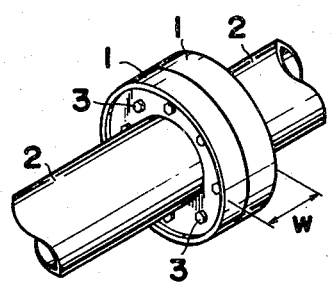
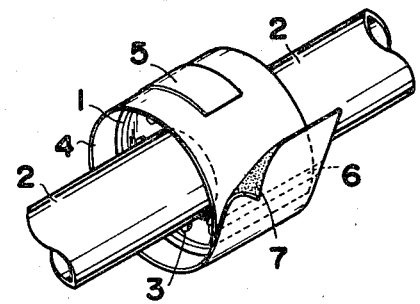
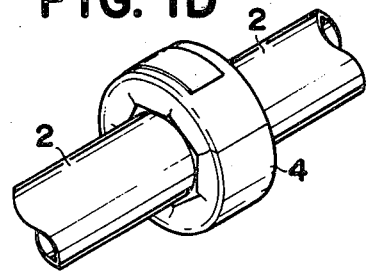
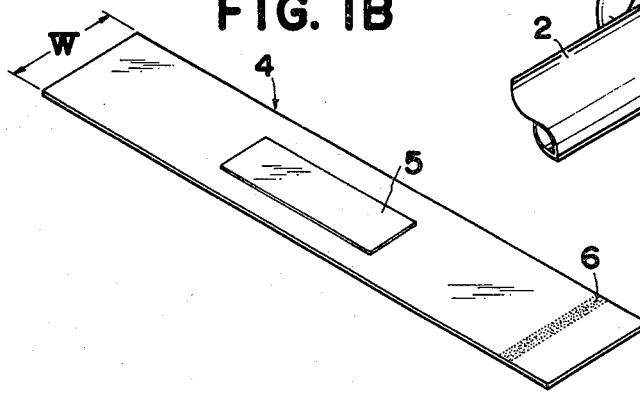
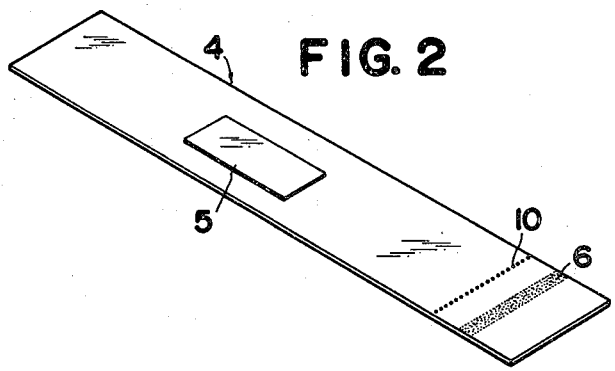

SEALING METHOD USING HEAT-SHRINKABLE FILM

BACKGROUND OF THE INVENTION

The present invention relates to a method of sealing an object connected to infinite elongated bodies such as pipe lines, wire systems or the like, easily and in a tamper-proof or anti-forgery manner. More particularly, the invention is concerned with a sealing method which is effective in material accountancy of nuclear materials.

The "material accountancy" of nuclear materials is defined as quite important safeguards. The "safeguards" is used as a generic term of various means for watching the nuclear materials and facilities to prevent the diversion of these materials and facilities from peaceful objects to military purposes, detecting possible diversion without delay and proving occurence of no diversion. As auxiliary means for the material accountancy, there have been developed effective "containment" technique and "surveillance" technique. Unfortunately, however, these developed techniques are still unsatisfactory.

In a uranium enrichment plant, for instance, it is proposed to seal flange joint portions of pipes to detect and prevent unauthorized re-jointing of the pipes. Such a seal has to meet various requirements such as easiness of the sealing work, high tamper-proof effect, high aging resistance and so forth. In addition, since the pipes usually have infinite length, the seal has to be effected only on the flange portion of the pipes, which in turn requires a specific device.

SUMMARY OF THE INVENTION

It is therefore an object of the present invention to provide a method of sealing a flange portion of pipes having infinite length in order to detect and prevent unauthorized re-jointing of the pipes.

It is another object of the present invention to provide a method of sealing a flange portion of pipes, which has easiness of the sealing work, high tamper-proof effect and high aging resistance.

It is further object of the present invention to provide a sealing method which can effectively be applied specifically for sealing a flange portion of a piping system such as of uranium enrichment plant.

According to the present invention, there is provided a method for sealing an object having a peripheral surface, surfaces substantially perpendicular to said peripheral surface and infinite elongated bodies projecting from said surfaces perpendicular to said peripheral surface, which method comprises: wrapping said peripheral surface with a heat-shrinkable film in such a manner that both side edges of said film extend beyond the side edges of said peripheral surface; bonding longitudinal edges of said film to each other; and heating said heat-shrinkable film to permit said film to shrink to thereby seal said peripheral surface and a peripheral portion of said surfaces perpendicular to said peripheral surface, except said infinite elongated bodies.

As described above, the object to be sealed by the sealing method of the invention has a peripheral surface, surfaces substantially perpendicular to the peripheral surfaces and infinite elongated bodies projecting from the surfaces perpendicular to the peripheral surface. Thus, the object is to protect an element in a transmission system for example, a flange joint portion of a piping system, various meters and instruments connected to the piping system, or meters and instruments connected to an electric wiring system.

BRIEF DESCRIPTION OF THE DRAWINGS

FIG. 1A illustrates a flange joint portion to be sealed by a sealing method of the invention;

FIG. 1B illustrates an example of a heat-shrinkable film to be employed in the invention;

FIGS. 1C and 1D illustrate a sealing method according to an embodiment of the invention;

FIG. 2 shows another example of a heat-shrinkable film to be employed in the invention.

DETAILED DESCRIPTION OF THE INVENTION

A preferred embodiment of the invention applied to a sealing of a flange joint portion of a piping system will be described hereinbelow with reference to the accompanying drawings.

FIG. 1A shows a flange joint portion to be sealed. Pipes 2 provided at their ends with flanges 1 are coupled to each other as the flanges are tightened to each other through a gasket or the like by means of bolts 3. As mentioned before, in a piping system of uranium enrichment plant, it is essential to prevent unauthorized re-jointing of pipes from the view point of the material accountancy of nuclear materials.

To this end, according to the invention, the sealing is accomplished using a single heat-shrinkable film 4 (See FIG. 1B). This heat-shrinkable film 4 is, for example, a film of polyvinyl chloride having a width W much greater than the width w of the flange joint portion ($W >> w$). A duplicating tack paper 5 on which an identification symbol is stamped is adhered to the reverse side of the heat-shrinkable film 4. A double-side adhesive tape 6 is secured to the film 4 near one of longitudinal ends of the film 4.

When this heat-shrinkable film 4 is wound around the peripheral surface of the flange portion, both side edges of the film extend beyond both side edges of peripheral surface of the flange portion, as will be seen from FIG. 1C. After temporarily bonding longitudinal ends of the film 4 by the adhesive tape 6, an adhesive agent 7 which is typically tetrahydrofuran is applied to the longitudinal ends of the film 4 to completely bond these ends to each other.

Then, as the thus wound heat-shrinkable film 4 is heated, the film 4 makes a shrinkage as shown in FIG. 1D, so that the film 4 effectively covers the peripheral portions of the flanges 1 including the bolts 3, thereby to complete the sealing.

A uniaxially or biaxially stretched heat-shrinkable thermoplastic such as polyethylene film, polypropyrene film, polyester film, polyvinylidene chloride film and so forth can be employed as the heat-shrinkable film, in addition to the above-described polyvinyl chloride film. However, the use of a uniaxially stretched thermoplastic film is preferred because, by arranging such that the direction of shrinkage of the film coincides with the direction of wrapping or winding of the film, the film after shrinkage is closely fixed to the peripheral surface of the flange portion and is bent toward the pipe at the edges of the peripheral surface, while presenting no substantial shrinkage in the direction of the pipe axis to avoid any distortion of the stamped portion 5. Test results show that, from the view points of shrinkage and basic properties such as transparency, workability, strength, low-temperature characteristic, migration of plasticizer and so forth, as well as suitability for sealing work and printing, polyvinyl chloride is most suitably employed as the material of the heat-shrinkable film.

For example, polyvinyl chloride film used in the invention shows the following characteristics. Namely, a film of 70 μm thick shows shrinkage of 5% in the longitudinal direction and 55% in the breadthwise direction when heated for 5 minutes in hot water bath of 100° C. Also, a film of 40 μm thick shows a shrinkage of 5% in the longitudinal direction and 54% in the breadthwise direction under the same heating condition. When heated by hot air, polyvinyl chloride film starts to shrink at a relatively low temperature of around 40° C., and shows a stable shrinkage over a wide temperature range. The maximum rate of shrinkage was 55%. These characteristics are quite suitable for the sealing purpose of the invention.

The longitudinal ends of the heat-shrinkable film wound around the flange joint portion can be bonded together either by adhesion using a solvent or an adhesive or by fusion through heating. The fusion bonding can be achieved by a bar seal method in which a heated plate is pressed against the film, an impulse sealing method in which a nickel-chromium ribbon is instantaneously applied with electric current, as well as by an internal heating such as ultrasonic wave welding method. However, since the film itself is heat-shrinkable, it is not preferred to apply heat to the film in the stage of bonding of longitudinal ends of the film. In the case where the bonding is made by means of an adhesive, the adhesive agent is selected in accordance with the material of the sealing body, i.e. the heat-shrinkable film. When polyvinyl chloride is used as the material of the heat-shrinkable film, it is most preferred to bond both longitudinal ends of the film by at first temporarily bonding them by means of the double-side adhesive tape and then permanently bonding the same by applying tetrahydrofuran, from the view point of high sealing effect, high tamper-proof effect (anti-replica effect), bonding workability and bonding force, as well as high aging resistance.

The sealing itself can be made only by wrapping the flange joint portion by the heat-shrinkable film. However, in order to attain high tamper-proof effect and to permit the confirmation of management situation as sealed state, it is preferred to put a stamped portion in the sealed portion. This can be achieved in various manners such as the use of tack paper beforehand adhered to the reverse side of the heat shrinkable film, the use of a duplicating tack paper as the tack paper, and the use of fragile label paper and hot stamping method. Among these methods, the use of the duplicating tack paper was found most suitable. Namely, data such as date of sealing, name of person in charge and so forth can be written in a pressure-sensitive, duplicating tack paper. One of the two leaves of the duplicating tack paper is adhered to the reverse side of the film, while the other leaf is adhered to a register. By so doing, it is possible to perfectly avoid any forgery of the stamp and to check up the stamp in the object with that in the register.

It is preferred to provide the seal with means for facilitating the opening of seal. Such seal-opening means may be perforations with machine, the use of tear tape, cutting method and so forth. However, the perforations 10 with machine as shown in FIG. 2 are most suitable.

Although the invention has been described with specific reference to the sealing of the flange joint portion of pipes, the sealing method of the invention can equally be applied to a valve portion in a piping system. In such a case, the heat-shrinkable film is wound around the valve including a handle portion thereof and, after bonded, the film is heated to shrink. By so doing, the operation of the handle portion of the valve is prohibited to make it possible to effect the management of flow rate. In this case, it is also possible to provide a stamped portion in which the set flow rate value and other data can be written.

According to the sealing method of the invention as hereinabove described, it is possible to effect a seal on objects having infinite elongated bodies such as piping, without substantial difficulty. In addition, the sealing method of the invention provides easy sealing work at the site, a good tamper-proof characteristic, a high aging resistance and a good stability. The tamper-proof characteristic is further improved by the provision of a stamped portion which permits by the provision of a stamped portion which permits also a confirmation of management situation as sealed state. The sealing effect of the invention can most suitably and effectively be used for material accountancy of nuclear materials when applied to various facilities handling nuclear materials.

What is claimed is:

1. A method for indicating tampering of an element positioned in a transmission system, the element having a peripheral surface facing outwardly and spaced from other components of the transmission system and having side surfaces extending inwardly from said peripheral surface, said method using a heat shrinkable film carrying identifying indicia thereon and comprising:
   wrapping said peripheral surface with the heat-shrinkable film in such a manner that both side edges of said film extend beyond the side edges of said peripheral surface;
   bonding longitudinal edges of said film to each other; and
   heating said heat-shrinkable film to permit said film to shrink to thereby seal said peripheral surface and a portion of said side surfaces adjacent to said peripheral surface, the film adapted to shrink to protect the element so that access to the element requires alteration of the film thereby providing an indication of such access.

2. A method for indicating tampering according to claim 1, wherein said heat-shrinkable film is a uniaxially stretched heat-shrinkable film and wrapping of the film around the peripheral surface is carried out such that the direction of shrinkage of the film coincides with the direction of wrapping of the film.

3. A method for indicating tampering according to claim 1 or 2, wherein said heat-shrinkable film is a polyvinyl chloride film and the step of bonding longitudinal edges of the film is carried out by temporarily adhering said longitudinal edges by using a double-side adhesive tape, and then permanently bonding by using an adhesive agent of tetrahydrofuran.

4. A method for indicating tampering according to claim 1 or 2, wherein said heat-shrinkable film is beforehand perforated along a line, whereby, after sealing, said film can be torn along the line of perforation.

5. A method for indicating tampering according to claim 1 or 2, wherein said heat-shrinkable film is provided with a tamper-proof stamped portion.

6. A method for indicating tampering according to claim 5, wherein said stamped portion comprises a duplicating tack paper on which is stamped an identification symbol, said duplicating tack paper being adhered to the side of said heat-shrinkable film facing the element.

7. A method for indicating tampering according to claim 1, wherein said transmission system is a piping system, said element being a flange portion of a pipe used in the pipe line, the film being shrunk about two joined confronting flange portions.

8. A method for indicating tampering according to claim 7, wherein said heat-shrinkable film is provided with a tamper-proof stamped portion.

9. A method for indicating tampering according to claim 8, wherein said stamped portion comprises a duplicating tack paper on which is stamped an identification symbol, said duplicating tack paper being adhered to the side of said heat-shrinkable film facing the element.

* * * * *